(No Model.)

A. M. SAUNDERS.
PIPE WELDING BALL.

No. 387,659.          Patented Aug. 14, 1888.

WITNESSES.
John Imirie
W. A. Seward

Augustus M. Saunders.
INVENTOR.
by James W. See,
Attorney.

UNITED STATES PATENT OFFICE.

AUGUSTUS M. SAUNDERS, OF McKEESPORT, PENNSYLVANIA.

PIPE-WELDING BALL.

SPECIFICATION forming part of Letters Patent No. 387,659, dated August 14, 1888.

Application filed April 20, 1888. Serial No. 271,366. (No model.)

*To all whom it may concern:*

Be it known that I, AUGUSTUS M. SAUNDERS, a subject of the Queen of Great Britain, and a resident of McKeesport, Allegheny county, Pennsylvania, have invented certain new and useful Improvements in Pipe-Welding Balls, of which the following is a specification.

My invention pertains to balls to be employed in the welding of pipes and tubes, and the improvements will be readily understood from the following description, taken in connection with the accompanying drawings, in which—

Figure 1:
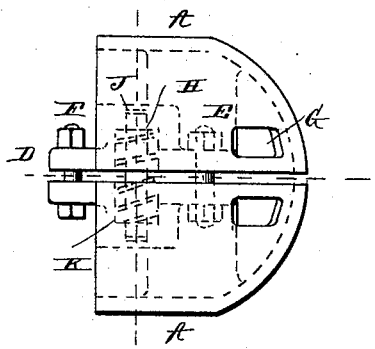
Figure 2:
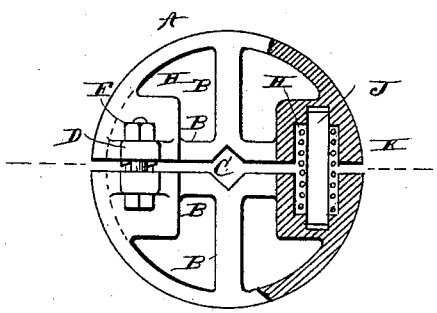
Figure 3:
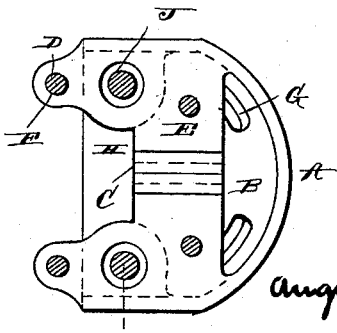

Figure 1 is a side elevation of my improved pipe-welding ball; Fig. 2, an end elevation of the same, a portion at the right appearing in vertical section; and Fig. 3, a plan of the same, the upper half of the ball being removed and the bolts and dowels appearing in horizontal section.

In the drawings, A indicates the two halves forming the ball, the ball being in the form of a cylindrical shell open at one end and closed at the other end, the closed end having a hemispherical form, the line of division between the two halves cutting the axis of the ball; B, arms in the halves of the ball, the entire ball being provided with a pair of these arms diametrically arranged and crossing at the center, the line of division between the two halves of the ball cutting and dividing one of these arms; C, an axial socket formed in the contiguous faces of the ball-halves, this socket being intended to loosely engage the usual rod; D, lugs projecting outwardly from the upper end of the ball, a pair on each half, these lugs being in the planes of the divisions of the divided arm; E, a pair of bolts passing through the divided arm well within the ball and serving to unite the two half-balls; F, a similar pair of bolts in the lugs D; G, openings in the closed end of the ball, serving to give access to the nuts of the bolts E; H, counterbored dowel-sockets in the joint-faces of the ball-halves, two of these sockets arranged in the same axis being disposed to one side of the center of the ball and another to the other side; J, dowel-pins fitting these sockets and serving to dowel the two halves of the ball together, and K spiral springs encircling these dowel-pins and seated within counterbores of the dowel-sockets.

The springs should be of such strength that when the two halves are drawn together so far by the bolts as to cause the peripheries to conform to a true circle of the desired internal diameter of the pipe the springs will have sufficient power to prevent the closer approach of the halves under ordinary compressive action of the welding-rolls and at the same time permit the approach of the halves, if extraordinary pressure be applied, in the direction of the axes of the bolts. Where four bolts are used, as illustrated, the dowel-pins J are not not essential and they may be omitted. If, however, the bolts F be omitted, as might be done in certain sizes of balls, then the dowel-pins should be employed, and they should be carefully fitted to secure proper registry of the two halves.

In operation the ball is used in the customary manner, care being taken to see that the weld of the skelp comes in such a position upon the periphery of the ball that the pressure upon the weld is in a direction tending as near as possible to compress the two halves of the ball together. Under ordinary circumstances the ball acts as a solid ball. When irregular laps of the skelp or blisters in the iron are reached during the operation, there will be caused an excessive internal pressure upon the ball, and thereupon the ball will yield a trifle in the direction of pressure and permit the obstruction to be passed, after which it will be automatically restored to its normal diameter.

As the ball wears out of true circular form, by reason of the main pressure of work being in the line of one of its diameters only, it may be restored to proper size by relieving the bolts a trifle and returning the ball.

The rod used with this ball may be the usual round rod squared at the end where it goes into the socket C. The ball-halves are not to be clamped upon the rod, nor are they to fit it with any degree of closeness, such as will interfere with the proper approach of the ball-halves to each other.

I claim as my invention—

1. A pipe-welding ball formed of two halves and provided with an axial socket for a rod, bolts uniting the two halves and serving as a means for adjusting the distance between them, and springs interposed between the halves and serving to separate the halves as far as the bolts will permit, combined substantially as and for the purpose set forth.

2. In a pipe-welding ball, the combination, substantially as set forth, of two ball-halves in shell form, a pair of internal bolts serving to unite the halves and adjust the distance between them, dowel-sockets in the contiguous faces of the halves, dowel-pins in such sockets, and springs interposed between the halves and serving to separate the halves as far as the attachment of the bolts will permit.

3. In a pipe-welding ball, the combination, substantially as set forth, of the ball-halves A, having arms B and sockets C, bolts E, located within the ball, bolts F, located outside the open end of the ball, and springs interposed between the two halves.

4. In a pipe-welding ball, the combination, substantially as set forth, of ball-halves provided with sockets C, bolts E, counterbored dowel-sockets H, dowel-pins J, and springs K.

AUGUSTUS M. SAUNDERS.

Witnesses:
GILBERT F. MYER,
HENRY W. DELONG.